United States Statutory Invention Registration [19]

[11] Reg. Number: H673

Hullah et al. [43] Published: Sep. 5, 1989

[54] INSTANT COFFEE SUBSTITUTE FROM SOYBEANS AND METHOD OF MAKING

[76] Inventors: William Hullah, 156 Abbey Wood Trail, Don Mills; Janet Cringle, 57 Palmdale Drive; Sandra Albrecht, 10 Macey Ave. #1617, both of Scarborough, Ontario, all of Canada

[21] Appl. No.: 151,591

[22] Filed: Feb. 2, 1988

[51] Int. Cl.[4] ..... A23F 5/00
[52] U.S. Cl. ..... 426/596; 426/431
[58] Field of Search ..... 426/594, 596, 598

[56] References Cited

U.S. PATENT DOCUMENTS

| | | | |
|---|---|---|---|
| 893,073 | 7/1908 | Herron | 426/594 |
| 1,103,207 | 7/1914 | Huber . | |
| 1,189,132 | 6/1916 | Kellogg . | |
| 1,204,032 | 11/1916 | Kellogg . | |
| 1,230,184 | 6/1917 | Lorenz . | |
| 1,348,999 | 8/1920 | Kellogg | 426/596 |
| 1,349,000 | 8/1920 | Kellogg . | |
| 1,366,495 | 1/1921 | Roewade | 426/598 |
| 1,956,427 | 4/1934 | McKinnis . | |
| 3,627,537 | 12/1971 | Beck . | |
| 3,876,806 | 4/1975 | Hempenius et al. . | |
| 4,187,324 | 2/1980 | Shirbroun | 426/598 |
| 4,194,018 | 3/1980 | Hodel et al. . | |
| 4,369,198 | 1/1983 | Uchi et al. . | |
| 4,699,798 | 10/1987 | MacLean . | |

*Primary Examiner*—John F. Terapane
*Assistant Examiner*—Daniel Metzmaier

[57] ABSTRACT

An instant coffee substitute is prepared from roasted soybeans. Soybeans are preheated until their interiors are at near roasting temperatures. The interiors of the preheated soybeans are maintained at roasting temperatures for an extended time to over-roast the soybeans. The roasted soybeans are the ground, extracted and filtered as necessary. After filtering, the extract is dried and later may be reconstituted. The product has the color, flavor and aroma of coffee, without any noticeable soy aroma or flavor.

20 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

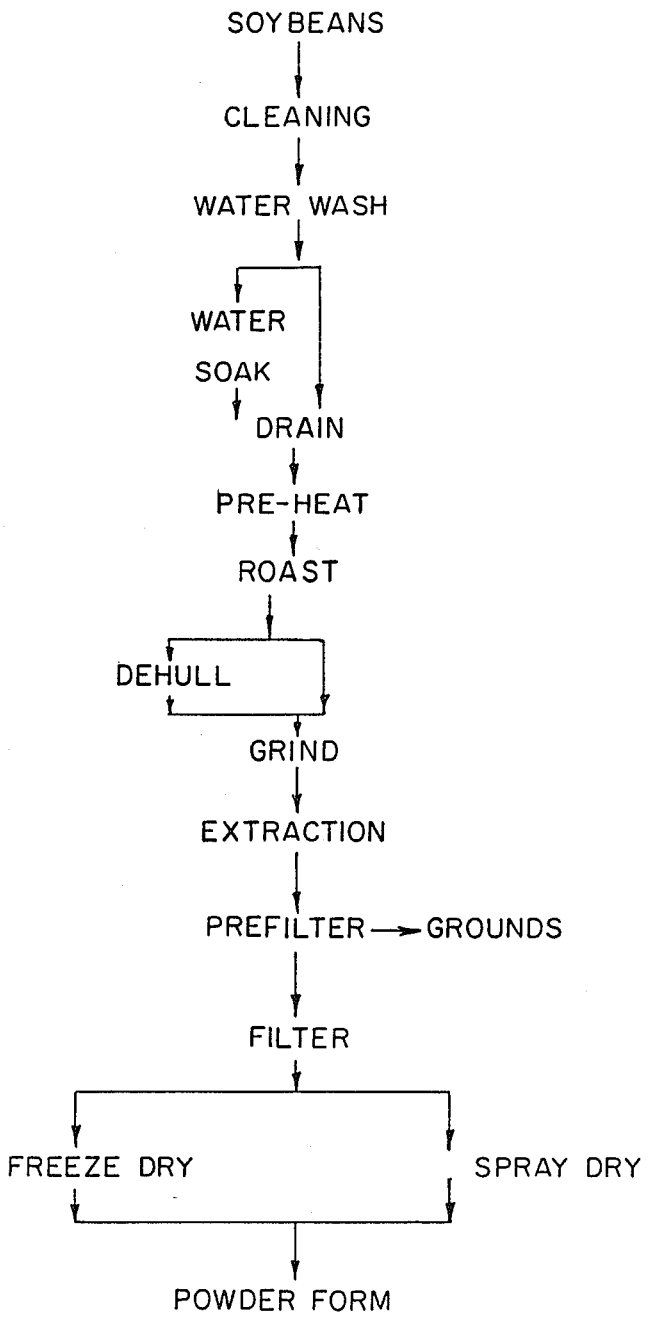
SOYBEANS
CLEANING
WATER WASH
WATER
SOAK
DRAIN
PRE-HEAT
ROAST
DEHULL
GRIND
EXTRACTION
PREFILTER
GROUNDS
FILTER
FREEZE DRY
SPRAY DRY
POWDER FORM

INSTANT COFFEE SUBSTITUTE FROM SOYBEANS AND METHOD OF MAKING

FIELD OF THE INVENTION

The present invention relates to coffee-substitutes and, more particularly, to coffee-substitutes produced from soybeans.

BACKGROUND OF THE INVENTION

Coffee substitutes have been prepared from a wide variety of starch bearing materials, including wheat, corn, rye, barley, beans, peas, nuts, etc. Usually, the material to be extracted is washed, dried, roasted and extracted. To counteract the bitter taste usually associated with such beverages, the prior art has, prior to roasting, mixed the extractable matter with sugar or with bran coated with carmelized saccharine.

While consumer acceptance of these substitute beverages, such as Postum TM , has been acceptable, the great majority of consumers are unable to accept these products as a substitute for coffee, due to their somewhat inferior taste, aroma and flavor.

In U.S. Pat. No. 4,137,324 to Shirbroun, green soy beans are defatted, preferably by crushing, prior to grinding and roasting. In one embodiment, the green soybeans are presoaked prior to crushing and defatting. Thereafter, the crushed, defatted soybeans are dried at 250° F. to 350° F. to a moisture content of from 11 to 13 wt. %. The dried soybeans are then ground and roasted. Shirbroun prefers slow roasting, preferably at 350° F. to 375° F., for up to 45 minutes, until the product has the appearance of ground coffee.

While consumers described the brewed Shirbroun product as having the appearance and taste of coffee, they also noted some soy aroma. To many coffee drinkers, aroma is essential to the enjoyment of coffee. Accordingly, the Shirbroun product is not entirely satisfactory to all coffee drinkers.

The aroma of coffee arises from the complex interaction of over 500 known volatile compounds and many unknown volatile compounds. The defatting of the soybean removes several lipids whose decomposition during roasting may influence the aroma of the roasted beans. Also, roasting alone does not always destroy the compounds responsible for soy aromas. Therefore, the Shirbroun products lack of the characteristic coffee aroma is not entirely surprising in light of the methods employed to process the soybeans.

Moreover, Shirbroun never suggests or attempts to make a satisfactory beverage which can substitute for an instant coffee. It is well known that instant hot beverages lack some of the flavor and aroma of the originally brewed product. Therefore, any lack of coffee flavor or aroma in a brewed product will be exaggerated in an instant product prepared from that brew.

SUMMARY OF THE INVENTION

It is an object of the present invention to produce a hot coffee-like beverage which overcomes the above-noted deficiencies of prior art products.

It is another object of the present invention to produce a hot beverage having the flavor and aroma of coffee.

It is a further object of the present invention to produce a hot instant coffee substitute having the aroma and flavor of coffee.

These and other objects are achieved by the present invention. In the method of the present invention, soybeans, whole or defatted, are preheated to near roasting temperature and then roasted for longer times than are conventionally employed. The product is brewed conventionally and the extract from brewing is dried by conventional methods to produce an instant coffee-like beverage. This instant coffee-substitute has excellent flavor and aroma.

When soybeans have not been defatted, a pre-filtering step is employed prior to the conventional post-extraction filtration to remove particles which might otherwise clog a filter during finish filtering.

Defatted soybeans may also be used for the present invention, although, as stated earlier, the product produced from defatted soybeans may lack lipid decomposition products that possibly influence the flavor and/or aroma of the beverage. Nevertheless, the instant beverage of the present invention, even when produced from defatted soybean meal, has a fine flavor and aroma, and lacks the flavor and aroma defects of prior art coffee substitutes.

While it is not desired to be bound by theory, it is believed that the excellent flavor and aroma of the present invention result from the high temperatures and longer roasting times employed, in combination with the drying step following extraction. Apparently, the higher temperatures and longer roasting times strengthen the flavor and aroma of the liquid extracted from the bean. Perhaps, at the upper extremes of roasting times and temperatures employed in the method of the present invention, the compound or compounds causing soy aroma also decompose to some extent. In any event, the concentration of the soy aroma-causing compounds in the extracted product are apparently reduced during the drying of the extract. The drying of the extract also reduces the coffee-like flavor and aroma of the extract, but, since these flavors and aromas were overly strong in the extract, this drying returns the flavor and aroma of the final instant beverage to a normal range after rehydration.

BRIEF DESCRIPTION OF THE DRAWING

The drawing is a flow chart illustrating a preferred process according to the present invention.

DETAILED DESCRIPTION OF THE PREFERRED EMBODIMENTS

The preferred starting material for the present invention are natural, dried, raw soybeans. Canadian soybeans are preferable, but any soybean may be used with excellent results. Alternatively, the starting material may be dehulled or defatted soybeans, or ground soybean meal.

When raw soybeans are used as the starting product, the raw beans are first cleaned to remove stones, other seeds, wood, etc. For example, the soybeans may be cleaned and sized by screening, cyclone separation, aeration and/or magnetic means. The whole beans should also be thoroughly rinsed, by a tumble/spray or vat immersion process, to remove soil.

After washing, the beans are drained and surface dried by preheating to nearly roasting temperatures, for example, in an air tunnel. Preheating should be performed at 150 to 400° F. until the temperature of the interior of the bean is about equal to the above preheating temperature. Preheating is preferably performed at 325–400° F. and even more preferably at 325–350° F.

Usually, preheating requires about 45 minutes at the preferred temperatures.

If desired, prior to preheating, the washed beans may be rehydrated by soaking an aqueous liquid, such as water. Generally, rehydration requires about 16 hours of soaking. Sucrose, or preferably dextrose, may be added to the water used for soaking at 1°–10° Brix to facilitate color and flavor development during the later roasting process. The rehydrated soybeans are then thoroughly drained before preheating.

After preheating, the soybeans are roasted in a conventional roaster, such as the Probat or Jabez Burns machine. The roasting step is both time and temperature dependent. Higher roasting temperatures and longer roasting times are preferred so that the soybeans are actually "over-roasted" in comparison to the roasting of coffee beans. This "over-roasting" decreases the retention of soluble solids by the soybean and thus increases the strength of the beverage later extracted therefrom. Roasting should be performed at 250°–400° F., preferably 400°–450° F. and most preferably at 400° F. The time of roasting, measured from the time the temperature inside of the beans is about equal to the roasting temperature, is about 5–60 minutes, preferably about 45–60 minutes, and most preferably about 45 minutes.

Because the present process measures the roasting time from the time the interiors of the beans have reached the roasting temperature, it is preferable to immediately transfer preheated beans, the interiors of which are at about or slightly below the roasting temperature, to the roaster with an intermediate cooling step. For example, beans at ambient temperatures may require 45 minutes before their interiors reach a roasting temperature of 325–350° F. Those internal temperatures may be achieved during preheating. If the preheated beans are then transferred directly to a roaster, roasting could be completed within about 60 minutes. If, however, the preheated beans were cooled to ambient temperatures prior to roasting, the beans would need to remain in the roaster for about 60 minutes in addition to the amount of time required to reheat the interior of the beans to a temperature range suitable for roasting (250–450° F). Thus, the cooled beans would need to remain with the roaster for about 100 minute.

After roasting, the beans are cooled to ambient temperatures and ground by conventional means, for example, in a Grindmaster Mill or a blender. The size of the grind may be determined by Tyler sieves to allow optimum extraction of flavor, aroma and color. If preground soybean meal is employed, grinding may be unnecessary. When raw soybeans are employed as a starting material, the optimum size for extraction (generally fine ground) must be balanced against the necessity of preventing clogging during the filtering of the extract due to the oils and fats in the beans. Therefore, when raw soybeans are used as the source material, the roasted beans should be ground coarse (about 60 mesh). The hulls may be removed prior to grinding, but it has been found that flow during subsequent filtering of the extract is speeded when the hulls are left on.

The ground beans are then mixed with hot water at about 1:4–9 parts by weight. Extraction may be facilitated by agitation and by maintaining a temperature of 180°–200° F. Extraction should be continued until the maximum amount of aroma, flavor and color has been extracted from the beans. Extraction may be achieved using a variety of conventional methods and extractors. Prior to extraction, the roasted soy beans may be mixed with traditional coffee extenders. If the ground, roasted beans are held within a "teabag" of appropriate porosity during extraction, further filtering of the extract is unnecessary. However, with most methods of extraction, e.g., percolation, the extract must be filtered.

Except when a porous envelope as described above is used for extraction, and especially where raw soybeans are used as the source material, two stages should be employed. The first stage is a prefiltering, usually through a filter of about 100 or less mesh to remove the bulk of the extracted grounds and to speed final filtering. In the final (i.e., finish) filtering, the extract is then passed through a finish filter (usually about 0.5 microns or finer average pore size) to remove any remaining solid particles and sludge. This finish filtering stage is conventional.

The finished extract is then dried by conventional methods (freeze-drying or spray-drying) to yield a powdered extract.

Reconstitution of this powdered extract in boiling water to about 0.8–5 degrees Brix results in a beverage having a pH of about 5.5. to 6.5 and a flavor, color and aroma very similar to coffee.

The beverage of the present invention lacks caffeine and has a nutritional profile better than that of coffee. The product of the present invention also has a higher protein content. Further, the beverage of the present invention does not deteriorate upon reheating. Therefore, not only does the product of the present invention appeal to consumers interested in health foods and concerned about caffeine, but it appeals to regular coffee drinkers as well.

While specific embodiments of the present invention have been disclosed in the foregoing description, it will be understood that various modifications within the scope of the invention may occur to those skilled in the art. Therefore, it is intended that adaptations and modifications should and are intended to be comprehended within the meaning and range of equivalents of the disclosed embodiments.

What is claimed is:

1. A process for producing an instant coffee substitute, comprising the steps of:

pre-heating soybeans at about 150°–400° F. until said soybeans are dry and their interiors are at the temperature used for preheating;

roasting said dried soybeans while the internal temperature thereof is at at about 250°–400° F. for 5–60 minutes;

extracting grounds of said roasted soybeans, said grounds having a size suitable for extraction, with water in a 1:4–9 ratio by weight at about 180°14 200° F. to extract flavor, aroma and color from said particles, thus producing an extract and extracted grounds;

filtering said extracted grounds from said extract; and drying said extract to produce a powder.

2. The method of claim 1, further comprising the step of reconstituting said powder with water.

3. The method of claim 2, wherein said reconstituting is performed by mixing the powder in boiling water sufficient to dilute said powder to 0.8–5° Brix.

4. The method of claim 1, wherein said preheating step is performed upon washed, raw soybeans.

5. The method of claim 1, further comprising, prior to said preheating, the step of:

rehydrating said soybeans by soaking in an aqueous solution.

6. The method of claim 5, wherein said aqueous liquid comprises a 1–10 Brix sucrose or dextrose solution in water.

7. The method of claim 1, wherein said preheating step is performed at 325°–350° F.

8. The method of claim 7, wherein said roasting is performed while the internal temperature of the dried soybeans is at 400°–450° F.

9. The method of claim 8, wherein said roasting performed for 45–60 minutes.

10. The method of claim 9, wherein said filtering is simultaneous with said extraction, said grounds being extracted with said water while being maintained within an envelope of sufficient porosity for water and extractable matter to flow therethrough but of insufficient porosity to permit the passage of said grounds therethrough.

11. The method of claim 1, wherein said filtering comprises two stages, as follows:

a prefilter stage wherein the bulk of said extracted grounds are removed from said extract; and a finish filtering stage, wherein fines remaining in said extract after said prefilter stage are removed.

12. The method of claim 11, wherein said prefilter stage comprises passing said extract and extracted grounds together through a filter of about 100 mesh.

13. The method of claim 12, wherein said finish filtering stage comprises passing the prefiltered extract through a filter having an average pore size of no greater than 0.5

14. The method of claim 9, wherein said soybeans which are preheated have been defatted.

15. The method of claim 9, wherein said soybeans are preheated while in the form of soybean meal.

16. The product of the process of claim 1.

17. The product of the process of claim 7.

18. The product of the process of claim 8.

19. The product of the process of claim 9.

20. The product of the process of claim 13.

* * * * *